E. PERIN.
Corn-Planter.
No. 58,284.
Patented Sept. 25, 1866.
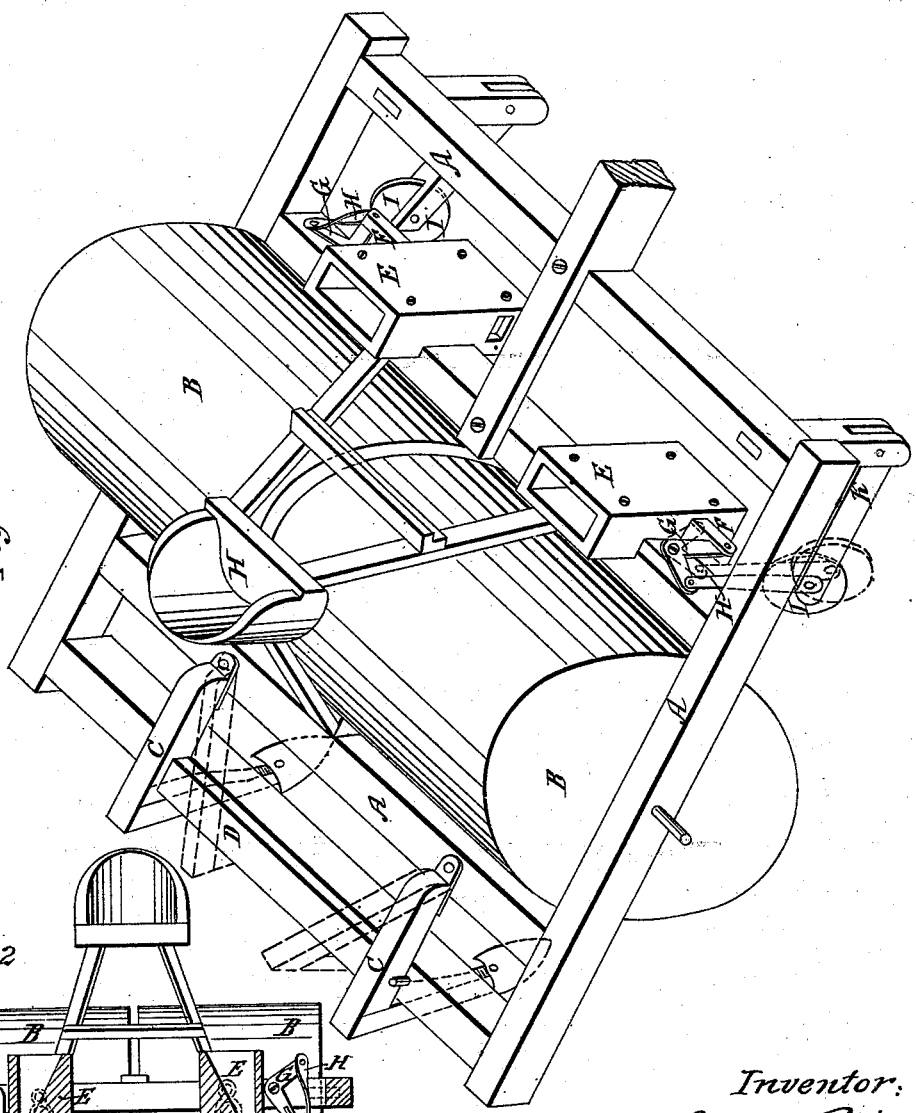
Fig. 1
Fig. 2
Witnesses:
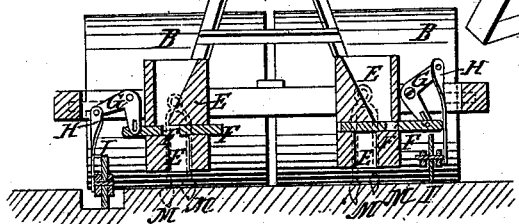
Inventor:
Ezra Perin
by
D P Holloway & Co
his Attys.

UNITED STATES PATENT OFFICE.

EZRA PERIN, OF CONNERSVILLE, INDIANA.

IMPROVEMENT IN ROLLER AND SEED-PLANTER COMBINED.

Specification forming part of Letters Patent No. 58,284, dated September 25, 1866.

*To all whom it may concern:*

Be it known that I, EZRA PERIN, of Connersville, in the county of Fayette and State of Indiana, have invented a new and useful Improvement in Seed-Planter and Roller Combined; and I do hereby declare that the following is a full, clear, and exact description of the construction and operation of the same, reference being had to the annexed drawings, made part of this specification, in which—

Figure 1 is a perspective view, and Fig. 2 is a vertical cross-section.

The same letters are used in designating identical parts.

The following description will enable a person skilled in the art to manufacture my roller, marker, and corn-planter combined.

A is the main frame, suitably framed, and to which the draft is applied. B B are large wooden rollers, the journals supporting which are carried by the frame A.

C C are shovel-plows, used for marking or furrowing out. When the machine is drawn across the field, the ground having first been suitably prepared, these plows cut two deep parallel furrows; or the furrows may be cut by other plows, as preferred. The furrows having been cut across the field in one direction, the machine is driven across it for seeding at right angles to the furrows. When the plows C are not in use they may be raised out of the ground, resting on the timber D.

E E are seed-boxes, the upper part of which holds the seed, and the lower part, E′, is a pipe, through which the seeds are dropped into the ground. Across the seed-boxes are placed the reciprocating slides F, passing across through suitable slots in the boxes. In these slides are recesses F′, sufficient to hold the number of grains of corn intended to be planted in a hill.

The slides are actuated by bell-cranks G, hinged to the main frame, and having one end attached by a loose bolt to the slides F, and the other similarly attached to the rod H, on the foot of which is placed the wheel I. The bolt by which the slide is attached to the bell-crank works in a slot in the bell-crank, allowing sufficient play. The wheels I are journaled on the bifurcated arms K, attached to the main frame.

The recess F′ in the slide is filled with corn from the box E. When the wheel I is running upon the smooth surface of the field the slide F is drawn under the box by the action of the rod H and bell-crank G, and it so remains until the wheel I falls into the furrow. When the recess in the slide is drawn from beneath the box and over the pipe E′ the grains of corn contained in the recess will fall into furrow. When the wheel I rises out of the furrow the recess will be replaced under the box and again filled. The internal form of the box and pipe is shown in Fig. 2.

M M are cultivator-teeth, placed behind the seed-pipes E′, and on each side thereof, so arranged that as the seeds are deposited in the furrow they will throw the earth over the seeds. These teeth are attached to the main frame A. The rollers B B, passing over the ground after the grain is deposited, press the earth down upon the grain and leave it completely covered by properly-compacted earth.

L is the driver's seat, resting on the main frame.

What I claim as my invention, and desire to secure by Letters Patent, is—

1. The combination on one frame of a seed-planter, rollers B and furrowing-plows C, when arranged substantially as set forth.

2. The combination of the wheel I, rod H, bell-crank G, and slide F with the seed-box E, the parts being constructed and arranged substantially as set forth.

In testimony whereof I have signed my name to this specification in the presence of two subscribing witnesses.

EZRA PERIN.

Witnesses:
JOSEPH H. CLARKE,
JOHN J. GREGG.